(12) United States Patent
Yoshimitsu

(10) Patent No.: US 7,842,104 B2
(45) Date of Patent: Nov. 30, 2010

(54) METHOD OF MANUFACTURING SOLID ELECTROLYTIC CAPACITOR

(75) Inventor: Satoru Yoshimitsu, Kishima-gun (JP)

(73) Assignees: SANYO Electric Co., Ltd., Moriguchi-shi (JP); SAGA SANYO INDUSTRIES Co., Ltd., Kishima-gun (JP)

( * ) Notice: Subject to any disclaimer, the term of this patent is extended or adjusted under 35 U.S.C. 154(b) by 0 days.

(21) Appl. No.: 12/622,919

(22) Filed: Nov. 20, 2009

(65) Prior Publication Data

US 2010/0127205 A1 May 27, 2010

(30) Foreign Application Priority Data

Nov. 27, 2008 (JP) .............................. 2008-303170

(51) Int. Cl.
*H01G 9/00* (2006.01)

(52) U.S. Cl. .................................................... 29/25.03

(58) Field of Classification Search ................. 29/25.03
See application file for complete search history.

(56) References Cited

U.S. PATENT DOCUMENTS 6,726,732 B2 *   4/2004   Kim et al. .................. 29/25.03

FOREIGN PATENT DOCUMENTS

JP         2005-109248 A      4/2005

* cited by examiner

*Primary Examiner*—Alexander G Ghyka
*Assistant Examiner*—Seahvosh J Nikmanesh
(74) *Attorney, Agent, or Firm*—Westerman, Hattori, Daniels & Adrian, LLP

(57) ABSTRACT

Provided is a method of manufacturing a solid electrolytic capacitor having a solid electrolyte. The solid electrolyte having a conductive polymer is formed by an oxidative polymerization reaction, using a polymerization liquid containing a monomer and a dopant. The dopant contains alkylammonium ions as a cationic component.

6 Claims, 1 Drawing Sheet

METHOD OF MANUFACTURING SOLID ELECTROLYTIC CAPACITOR

BACKGROUND OF THE INVENTION

1. Field of the Invention

The present invention relates to a method of manufacturing a solid electrolytic capacitor having a solid electrolyte made of a conductive polymer.

2. Description of the Background Art

Recently, as electronic equipment is more digitalized and uses a higher frequency, and reflow temperature is increased by using lead-free soldering, there is a need for a capacitor having a smaller size, a larger capacity, a lower impedance in a high frequency region, and a high heat resistance.

The above need has been accomplished by a winding-type electrolytic capacitor in which a capacitor element formed by winding a cathode foil and an anode foil with a separator being interposed therebetween is accommodated in a metal case and sealed with a sealing rubber. In such an electrolytic capacitor, a conductive polymer having a high conductivity such as polypyrrole or polythiophene is used as a solid electrolyte.

Examples of solid electrolytic capacitors using a conductive polymer as a solid electrolyte include a solid electrolytic capacitor provided with polyethylenedioxythiophene as a solid electrolyte. The solid electrolyte of the solid electrolytic capacitor is produced by impregnating a capacitor element formed by winding an anode foil and a cathode foil with a separator being interposed therebetween with a solution containing 3,4-ethylenedioxythiophene and an oxidant solution in order, and causing a polymerization reaction (Japanese Patent Laying-Open No. 2005-109248).

SUMMARY OF THE INVENTION

The above polymerization reaction is chemical oxidative polymerization polymerizing 3,4-ethylenedioxythiophene using sulfonic acid ferric salt as a dopant and oxidant. When a conductive polymer is formed by a chemical oxidative polymerization method using sulfonic acid ferric salt, it is necessary to use a large amount of ferric ions at the time of chemical oxidative polymerization to improve polymerization yield.

On this occasion, since a ferric ion has a valence of 3 and a sulfonic acid ion has a valence of 1, 3 moles of the sulfonic acid ions are present relative to 1 mole of the ferric ions in terms of a stoichiometric ratio, and accordingly the sulfonic acid ions in an amount three times that of the ferric ions are present in a polymerization liquid. Although a small portion of the sulfonic acid ions in the polymerization liquid is incorporated into the conductive polymer as a dopant at the time of the chemical oxidative polymerization, most of the sulfonic acid ions remain in the polymerization liquid or are present in the solid electrolyte as impurities.

Most of the sulfonic acid ions present in the solid electrolyte are present as sulfonic acid ferrous salts and sulfonic acid ferric salts. Since these salts have high deliquescence, when the solid electrolytic capacitor is used under a high humidity environment for a long time, these salts absorb moisture penetrating into the capacitor and generates a large amount of sulfonic acid ions inside the capacitor. Since the generated sulfonic acid ions deteriorate the anode foil, the cathode foil, and a dielectric coating film, they have caused a reduction in capacitance and an increase in ESR of the solid electrolytic capacitor in durability and heat resistance tests.

Further, at the time of a reflow process for mounting the solid electrolytic capacitor on a printed board, and in the durability and heat resistance tests that require a long time, ferrous ions remaining in a large amount in the solid electrolyte of the solid electrolytic capacitor act as a reducing agent. By this action, oxygen in the dielectric coating film is reduced and defective portions lacking oxygen are generated in the dielectric coating film, resulting in an increase in leak current of the solid electrolytic capacitor, occurrence of a short circuit failure, and the like.

As described above, the solid electrolytic capacitor using a conductive polymer as a solid electrolyte has a problem that there occurs deterioration in various electrical properties and a short circuit due to deterioration of the conductive polymer that may be caused by various factors.

In view of the above problem, the present invention provides a method of manufacturing a solid electrolytic capacitor excellent in heat resistance by forming a conductive polymer as a solid electrolyte using a dopant containing alkylammonium ions as a cationic component.

The present invention is a method of manufacturing a solid electrolytic capacitor having a solid electrolyte, the solid electrolyte having a conductive polymer formed by an oxidative polymerization reaction using a polymerization liquid, the polymerization liquid containing a monomer and a dopant containing alkylammonium ions as a cationic component, the alkylammonium ions being secondary ammonium ions.

Preferably, the dopant contains sulfonic acid ions as an anionic component.

Particularly preferably, the alkylammonium ions are dimethylammonium ions.

Preferably, the polymerization liquid contains 1.0 to 1.5 moles of the sulfonic acid ions relative to 1 mole of the alkylammonium ions.

Preferably, the polymerization liquid further contains, as an oxidant, an ammonium salt formed from one or more types selected from ammonium sulfate, ammonium persulfate, ammonium oxalate, and ammonium perchlorate.

Further, preferably, the oxidative polymerization reaction is performed under a reduced-pressure atmosphere.

By forming a conductive polymer as a solid electrolyte using a dopant containing alkylammonium ions as a cationic component as in the present invention, a method of manufacturing a solid electrolytic capacitor excellent in heat resistance can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
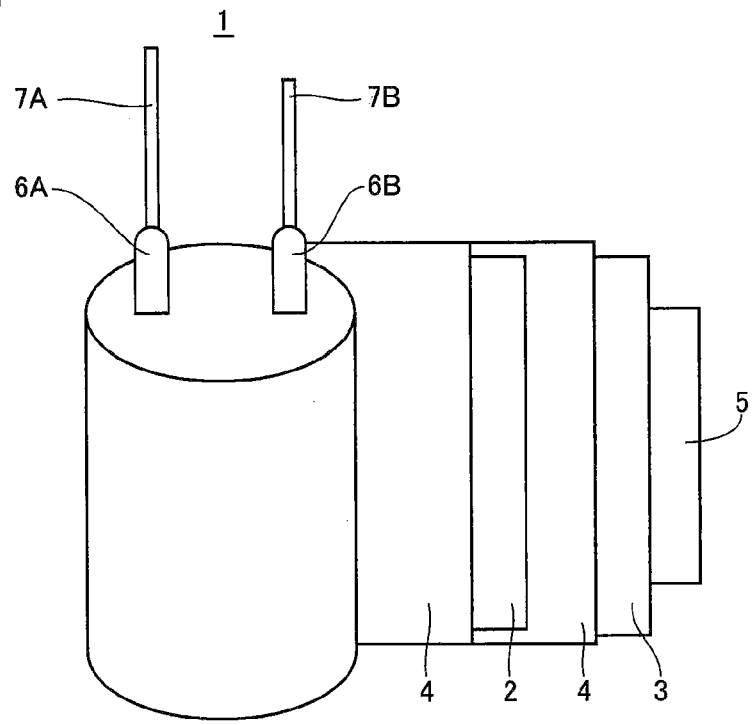
FIG. 1 is a perspective view of a capacitor element in accordance with the present embodiment, showing a portion thereof in an exploded state.
Figure 2:
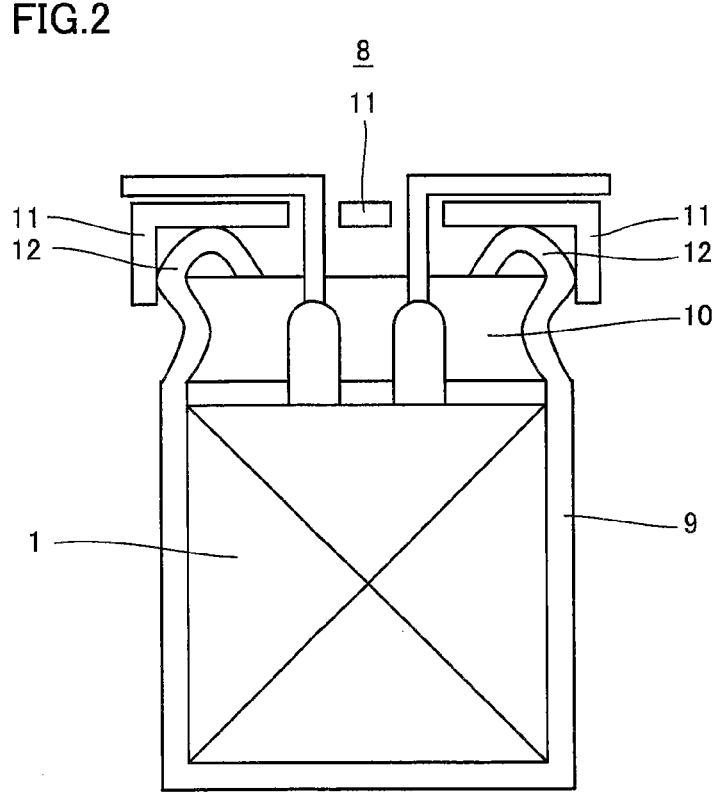
FIG. 2 is a cross sectional view of a solid electrolytic capacitor in accordance with the present embodiment.

The best mode for carrying out the present invention will be described. A solid electrolytic capacitor 8 in accordance with the present embodiment shown in FIG. 2 is produced as follows. Firstly, as shown in FIG. 1, an anode foil 2 and a cathode foil 3 are wound with a separator 4 being interposed therebetween, and secured with a winding stop tape 5 to produce a capacitor element 1. Leads 7A and 7B to serve as terminals are connected to anode foil 2 and cathode foil 3 through lead tabs 6A and 6B made for example of aluminum, respectively.

The number of the leads connected to the anode foil and the cathode foil is not particularly limited as long as one or more leads are connected to each foil, and the number of the anode foil and the cathode foil may be one or a plural number for each. Further, the number of the anode foil may be the same as or different from the number of the cathode foil. A dielectric coating film made of an oxide coating film or the like is formed on a surface of at least the anode foil, among the anode foil and the cathode foil. Each of anode foil 2 and cathode foil 3, the dielectric coating film, lead tabs 6A and 6B, and leads 7A and 7B can be produced by a known technique using a known material.

Next, a polymerization liquid is produced. In the present invention, a polymerization liquid refers to an entire solution used for an oxidative polymerization reaction, and may be formed of one solution or a plurality of solutions. For example, the polymerization liquid may be one solution containing a monomer to form a conductive polymer, a dopant, and the like, or two solutions, that is, a monomer solution containing a monomer and a dopant solution containing a dopant.

As the monomer, a known monomer can be used, and for example, one selected from thiophene, pyrrole, aniline, and derivatives thereof can be used as appropriate. As the dopant, sulfonic acid alkylamine salt is used. The sulfonic acid alkylamine salt is composed of sulfonic acid ions as an anionic component and alkylammonium ions as a cationic component.

As the sulfonic acid ions, alkylsulfonic acid ions such as methanesulfonic acid ions and ethanesulfonic acid ions, or anions of a derivative of an aromatic sulfonic acid such as benzenesulfonic acid ions, naphthalenesulfonic acid ions, toluenesulfonic acid ions, methoxybenzenesulfonic acid ions, and phenolsulfonic acid ions can be used. In particular, using phenolsulfonic acid ions that exhibit both aromaticity and good heat resistance is preferable.

The alkylammonium ions refer to primary ammonium ions, secondary ammonium ions, and tertiary ammonium ions in which at least one of hydrogen groups of an ammonium ion is substituted with an alkyl group. As the alkylammonium ions, the secondary ammonium ions such as dimethylammonium ions, dipropylammonium ions, diisopropylammonium ions, and N,N-dimethylpropane-2-ammonium ions are suitable. In particular, a solid electrolyte produced using a dopant having dimethylammonium ions exhibits good heat resistance.

Specifically, when phenolsulfonic acid dimethylamine salt is used as a dopant, a solid electrolytic capacitor exhibiting excellent heat resistance can be produced, when compared with a case where other sulfonic acid amine salts are used.

The reason that the secondary ammonium ions are suitable as a cationic component of the dopant will be described below. The dopant can be used together with a strong acid oxidant described later. When the capacitor element is immersed in a dopant and oxidant solution containing a dopant solution and an oxidant solution, if the dopant and oxidant solution has a high acidity, the anode foil and the cathode foil of the capacitor element may be eroded.

When the primary or tertiary ammonium ions are used, the dopant and oxidant solution has a relatively high acidity of pH 1 to 3, whereas when the secondary ammonium ions are used, the dopant and oxidant solution has an acidity of pH 4 or more, because the secondary ammonium ions are strongly basic. Therefore, erosion of the anode foil and the cathode foil can be reduced by using the secondary ammonium ions as a cationic component of the dopant. It is to be noted that, when a conventional organic sulfonic acid iron salt is used, the dopant and oxidant solution has an acidity of pH 1 or less, and erosion of the anode foil and the cathode foil is significant.

When the content of the sulfonic acid ions in the dopant solution containing the dopant is in the range of 1.0 to 1.5 moles relative to 1 mole of the alkylammonium ions, a solid electrolytic capacitor particularly excellent in heat resistance can be produced.

As a solvent used for the dopant solution, a solvent made of one or more types selected from methanol, ethanol, propanol, butanol, and water is preferable. In particular, when 3,4-ethylenedioxythiophene is employed as a monomer to form a conductive polymer, using water is preferable, considering miscibility with 3,4-ethylenedioxythiophene and manufacturing cost.

The dopant solution may further contain an oxidant. By having an oxidant in the polymerization liquid, a polymerization reaction can proceed excellently not only in a case where the chemical oxidative polymerization method is used but also in a case where an electrolytic oxidative polymerization method is used to perform an oxidative polymerization reaction, and thus a good-quality solid electrolyte can be formed. The dopant and oxidant solution containing the dopant and an oxidant may be produced by adding an oxidant to the dopant solution and stirring the solution, or by producing the dopant solution and an oxidant solution containing an oxidant, and then mixing and stirring the both solutions.

As the oxidant, an ammonium salt formed from such as ammonium sulfate, ammonium persulfate, ammonium oxalate, or ammonium perchlorate is used, and in particular using ammonium persulfate is preferable. When an oxidant solution is prepared as described above, the concentration of the oxidant in the oxidant solution is not more than 50 wt % in terms of solubility and the like.

When separate solutions, that is, a monomer solution containing a monomer and a dopant solution containing a dopant, are used as the polymerization liquid, the concentration of the dopant in the dopant solution is not less than 20 wt %, preferably not less than 40 wt %. Since the dopant is contained in a high concentration of not less than 40 wt %, the dopant and oxidant solution can be produced excellently and quickly by the dopant and the oxidant being brought into contact frequently.

A polymerization liquid as described above is prepared and used to form a solid electrolyte made of a conductive polymer by the chemical oxidative polymerization method or the electrolytic oxidative polymerization method. Herein, a description will be given of the case of using the chemical oxidative polymerization method.

In the chemical oxidative polymerization method, capacitor element 1 is impregnated with the polymerization liquid by immersing capacitor element 1 in the polymerization liquid or applying the polymerization liquid to capacitor element 1.

An oxidative polymerization reaction is started by impregnating capacitor element 1 with the polymerization liquid, and it is preferable to leave capacitor element 1 thereafter at ordinary temperature under a reduced-pressure atmosphere, for one to six hours, preferably for two to three hours. Preferably, the pressure on this occasion is reduced from atmospheric pressure by 80 kPa or more. By leaving capacitor element 1 under a reduced-pressure atmosphere, a monomer, a dopant, an oxidant, and the like in the polymerization liquid easily permeate capacitor element 1, and thus a solid electrolyte made of an excellent conductive polymer can be formed.

After forming the solid electrolyte as described above, capacitor element 1 having the solid electrolyte formed therein is accommodated in a bottomed case 9, using known material and technique. Then, after a sealing member 10 is placed on capacitor element 1, an opening end portion 12 of bottomed case 9 is subjected to pressing in a lateral direction and curling to seal capacitor element 1, and thereby solid electrolytic capacitor 8 is produced. On this occasion, a seat plate 11 may be further attached to provide a structure adapted for surface mounting.

Examples

Example 1

Etching treatment was performed to prepare an anode foil made of aluminum foil having a dielectric coating film formed on a surface thereof and a cathode foil made of aluminum foil. Then, the anode foil and the cathode foil were wound with a separator sheet being interposed therebetween, and secured with a winding stop tape to produce a capacitor element. Leads to serve as terminals were connected beforehand to the anode foil and the cathode foil, through tabs. Thereafter, the capacitor element was subjected to chemical conversion treatment of a cut section.

Next, a monomer solution containing 3,4-ethylenedioxythiophene as a monomer, and a dopant and oxidant solution containing phenolsulfonic acid methylamine salt as a dopant and ammonium persulfate as an oxidant were prepared as a polymerization liquid. The dopant and oxidant solution was produced by preparing a 75 wt % aqueous solution of phenolsulfonic acid methylamine and a 45 wt % aqueous solution of ammonium persulfate separately, and mixing and stirring the both aqueous solutions. Herein, the dopant solution was prepared such that 1 mole of phenolsulfonic acid ions was contained in the dopant solution relative to 1 mole of methylammonium ions. The dopant and oxidant solution had an acidity of pH 2.2.

Subsequently, the capacitor element was immersed in the monomer solution, and then immersed in the dopant and oxidant solution. Thereafter, the capacitor element was taken out from the dopant and oxidant solution, and left at room temperature under atmospheric pressure for three hours. Then, heating treatment at about 120° C. was performed to dry the capacitor element. Thereby, an oxidative polymerization reaction was performed to form a solid electrolyte made of a conductive polymer.

The capacitor element having the solid electrolyte formed as described above was accommodated in a bottomed aluminum case, and the capacitor element was sealed with a sealing member made of an elastic body. Then, an opening end portion of the bottomed aluminum case was subjected to pressing in the lateral direction and curling, and aging treatment was performed to produce a solid electrolytic capacitor.

Example 2

A solid electrolytic capacitor was produced as in Example 1 except for using phenolsulfonic acid trimethylamine salt as a dopant and preparing a dopant solution such that 1 mole of phenolsulfonic acid ions was contained in the dopant solution relative to 1 mole of trimethylammonium ions. A dopant and oxidant solution had an acidity of pH 3.0.

Example 3

A solid electrolytic capacitor was produced as in Example 1 except for using phenolsulfonic acid diethylamine salt as a dopant and preparing a dopant solution such that 1 mole of phenolsulfonic acid ions was contained in the dopant solution relative to 1 mole of diethylammonium ions. A dopant and oxidant solution had an acidity of pH 4.9.

Example 4

A solid electrolytic capacitor was produced as in Example 1 except for using naphthalenesulfonic acid dimethylamine salt as a dopant and preparing a dopant solution such that 1 mole of naphthalenesulfonic acid ions was contained in the dopant solution relative to 1 mole of dimethylammonium ions. A dopant and oxidant solution had an acidity of pH 5.5.

Example 5

A solid electrolytic capacitor was produced as in Example 1 except for using phenolsulfonic acid dimethylamine salt as a dopant and preparing a dopant solution such that 0.5 mole of phenolsulfonic acid ions was contained in the dopant solution relative to 1 mole of dimethylammonium ions. A dopant and oxidant solution had an acidity of pH 4.9.

Example 6

A solid electrolytic capacitor was produced as in Example 5 except for preparing a dopant solution such that 1.0 mole of phenolsulfonic acid ions was contained in the dopant solution relative to 1 mole of dimethylammonium ions. A dopant and oxidant solution had an acidity of pH 5.6.

Example 7

A solid electrolytic capacitor was produced as in Example 5 except for preparing a dopant solution such that 1.3 moles of phenolsulfonic acid ions were contained in the dopant solution relative to 1 mole of dimethylammonium ions. A dopant and oxidant solution had an acidity of pH 5.7.

Example 8

A solid electrolytic capacitor was produced as in Example 5 except for preparing a dopant solution such that 1.5 moles of phenolsulfonic acid ions were contained in the dopant solution relative to 1 mole of dimethylammonium ions. A dopant and oxidant solution had an acidity of pH 5.7.

Example 9

A solid electrolytic capacitor was produced as in Example 5 except for preparing a dopant solution such that 1.7 moles of phenolsulfonic acid ions were contained in the dopant solution relative to 1 mole of dimethylammonium ions. A dopant and oxidant solution had an acidity of pH 5.9.

Comparative Example 1

A solid electrolytic capacitor was produced as in Example 1 except for not preparing a dopant solution and an oxidant solution separately, and using a butanol solution containing p-toluenesulfonic acid ferric salt as a dopant and oxidant solution. On this occasion, 3 moles of p-toluenesulfonic acid ions were contained in the dopant and oxidant solution relative to 1 mole of ferric ions. The dopant and oxidant solution had an acidity of pH 0.5.

For each of the solid electrolytic capacitors produced in Examples 1 to 9 and Comparative Example 1, a capacitance ($\mu F$) at a frequency of 120 Hz and an ESR (Equivalent Series Resistance) ($m\Omega$) at a frequency of 100 kHz were measured. Thereafter, a reflow test was conducted at 230° C. or more for 30 seconds, with a maximum temperature of 250° C., and a capacitance and an ESR after the reflow test were measured under the same conditions. A capacitance change rate (%) and an ESR change rate (times) were calculated from these results. Further, the number of occurrence of a short circuit failure after the reflow test was checked for each of the solid electrolytic capacitors. Table 1 shows the results.

In Table 1, the capacitance and the ESR before the reflow test are indicated as an initial capacitance and an initial ESR, respectively, and the capacitance and the ESR after the reflow test are indicated as a post-test capacitance and a post-test ESR, respectively. An actual measurement value for each capacitance and each ESR indicates an average value of 30 solid electrolytic capacitors produced in each of Examples 1 to 9 and Comparative Example 1. The number of occurrence of a short circuit failure was checked similarly, using 30 solid electrolytic capacitors.

TABLE 1

| | Initial Capacitance ($\mu F$) | Initial ESR ($m\Omega$) | Post-Test Capacitance ($\mu F$) | Post-Test ESR ($m\Omega$) | Capacitance Change Rate | ESR Change Rate | Number of Short Circuits |
|---|---|---|---|---|---|---|---|
| Example 1 | 150 | 34.5 | 142 | 39.7 | −5.3 | 1.15 | 3 |
| Example 2 | 152 | 26.4 | 148 | 27.5 | −2.4 | 1.04 | 2 |
| Example 3 | 151 | 23.2 | 148 | 24.1 | −2.3 | 1.04 | 0 |
| Example 4 | 133 | 25.7 | 128 | 26.0 | −3.7 | 1.01 | 0 |
| Example 5 | 144 | 30.7 | 137 | 37.5 | −4.6 | 1.22 | 2 |
| Example 6 | 152 | 28.0 | 145 | 28.6 | −4.4 | 1.02 | 0 |
| Example 7 | 155 | 23.4 | 151 | 23.6 | −2.5 | 1.01 | 0 |
| Example 8 | 151 | 29.6 | 146 | 29.9 | −3.0 | 1.01 | 0 |
| Example 9 | 150 | 40.9 | 143 | 42.1 | −4.4 | 1.03 | 1 |
| Comparative Example 1 | 149 | 33.3 | 141 | 59.9 | −5.5 | 1.80 | 4 |

As can be seen from Table 1, in the solid electrolytic capacitors in Examples 1 to 9 using sulfonic acid amine salt as a dopant, the capacitance change rate and the ESR change rate before and after the reflow test were low, and occurrence of a short circuit failure was suppressed, when compared with those of the solid electrolytic capacitor in Comparative Example 1 using p-toluenesulfonic acid ferric salt as a dopant and oxidant. Thereby, it was found that a solid electrolytic capacitor excellent in heat resistance can be produced by using sulfonic acid amine salt as a dopant.

Further, when Example 6 was compared with Examples 1 and 2, the solid electrolytic capacitor produced using phenolsulfonic acid dimethylamine salt containing the secondary ammonium ions as a dopant had a lower ESR change rate and a fewer number of short circuits than the solid electrolytic capacitors produced using phenolsulfonic acid methylamine salt containing the primary ammonium ions and phenolsulfonic acid trimethylamine salt containing the tertiary ammonium ions, respectively. Thereby, it was found that a solid electrolytic capacitor excellent in heat resistance can be produced by using the secondary ammonium ions as a cationic component of the dopant.

Furthermore, considering the initial capacitances before the reflow test, it was found that the solid electrolytic capacitors in Examples 1 to 3 and Examples 5 to 9 produced using phenolsulfonic acid amine salt as a dopant had a greater capacitance and more excellent properties than the solid electrolytic capacitor in Example 4 produced using naphthalene-sulfonic acid amine salt as a dopant.

In addition, when Examples 6 to 8 were compared with Examples 5 and 9, the solid electrolytic capacitors produced using a dopant solution containing 1.0 to 1.5 moles of phenolsulfonic acid ions relative to 1 mole of dimethylammonium ions had lower capacitance change rate and ESR change rate, and a fewer number of short circuits, than the solid electrolytic capacitors produced using a dopant solution containing phenolsulfonic acid ions in a ratio other than that. Thereby, it was found that a solid electrolytic capacitor excellent in heat resistance can be produced by using a dopant solution containing 1.0 to 1.5 moles of phenolsulfonic acid ions relative to 1 mole of dimethylammonium ions.

Next, an oxidative polymerization reaction under a reduced-pressure atmosphere in the chemical oxidative polymerization method was considered.

Example 10

A solid electrolytic capacitor was produced as in Example 6 except for leaving the capacitor element, which had been impregnated with the polymerization liquid, at room temperature for three hours under a reduced-pressure atmosphere having a pressure reduced from atmospheric pressure by 75 kPa, instead of leaving the capacitor element at room temperature for three hours under atmospheric pressure.

Example 11

A solid electrolytic capacitor was produced as in Example 6 except for leaving the capacitor element, which had been impregnated with the polymerization liquid, at room temperature for three hours under a reduced-pressure atmosphere having a pressure reduced from atmospheric pressure by 80 kPa, instead of leaving the capacitor element at room temperature for three hours under atmospheric pressure.

Example 12

A solid electrolytic capacitor was produced as in Example 6 except for leaving the capacitor element, which had been impregnated with the polymerization liquid, at room temperature for three hours under a reduced-pressure atmosphere having a pressure reduced from atmospheric pressure by 90 kPa, instead of leaving the capacitor element at room temperature for three hours under atmospheric pressure.

Example 13

A solid electrolytic capacitor was produced as in Example 6 except for leaving the capacitor element, which had been impregnated with the polymerization liquid, at room temperature for three hours under a reduced-pressure atmosphere having a pressure reduced from atmospheric pressure by 100 kPa, instead of leaving the capacitor element at room temperature for three hours under atmospheric pressure.

For each of the solid electrolytic capacitors produced in Examples 6 and 10 to 13, a capacitance ($\mu F$) at a frequency of 120 Hz and an ESR ($m\Omega$) at a frequency of 100 kHz were measured. Thereafter, a reflow test was conducted at 230° C. or more for 30 seconds, with a maximum temperature of 250° C., and a capacitance and an ESR after the reflow test were measured under the same conditions. A capacitance change rate (%) and an ESR change rate (times) were calculated from these results. Further, the number of occurrence of a short circuit failure after the reflow test was checked for each of the solid electrolytic capacitors. Table 2 shows the results.

In Table 2, the capacitance and the ESR before the reflow test are indicated as an initial capacitance and an initial ESR, respectively, and the capacitance and the ESR after the reflow test are indicated as a post-test capacitance and a post-test ESR, respectively. An actual measurement value for each capacitance and ESR indicates an average value of 30 solid electrolytic capacitors produced in each of Examples 6 and 10 to 13. The number of occurrence of a short circuit failure was checked similarly, using 30 solid electrolytic capacitors.

TABLE 2

| | Initial Capacitance ($\mu F$) | Initial ESR ($m\Omega$) | Post-Test Capacitance ($\mu F$) | Post-Test ESR ($m\Omega$) | Capacitance Change Rate | ESR Change Rate | Number of Short Circuits |
|---|---|---|---|---|---|---|---|
| Example 6 | 152 | 28.0 | 145 | 28.6 | −4.4 | 1.02 | 0 |
| Example 10 | 152 | 24.6 | 149 | 24.8 | −2.0 | 1.01 | 0 |
| Example 11 | 154 | 20.1 | 152 | 20.3 | −1.5 | 1.02 | 0 |
| Example 12 | 157 | 19.9 | 156 | 19.9 | −0.8 | 1.00 | 0 |
| Example 13 | 161 | 18.1 | 160 | 18.1 | −0.7 | 1.00 | 0 |

As can be seen from Table 2, the solid electrolytic capacitors in Examples 10 to 13 produced by performing an oxidative polymerization reaction under a reduced-pressure atmosphere had a lower capacitance change rate and was more excellent in heat resistance when compared with the solid electrolytic capacitor in Example 6 produced by leaving the capacitor element in the atmosphere. It was found that, particularly when the pressure was reduced from atmospheric pressure by 80 kPa or more (Examples 11 to 13), the ESR before the reflow test of the solid electrolytic capacitor was suppressed low, and a solid electrolyte excellent in conductivity was formed.

The embodiment and examples described above are merely provided to describe the present invention, and should not be interpreted as restricting the invention described in the scope of claims. The present invention can be freely modified within the scope of claims and within the scope having equivalent meaning. For example, although the solid electrolytic capacitor described in the embodiment and examples is the one including a capacitor element formed by winding an anode foil and a cathode foil, the present invention is not limited thereto, and is also applicable to a capacitor element formed by sequentially forming a dielectric coating film, a solid electrolyte, and a cathode drawing layer on a circumferential surface of a valve metal sintered body or a valve metal foil.

What is claimed is:

1. A method of manufacturing a solid electrolytic capacitor having a solid electrolyte,
    said solid electrolyte having a conductive polymer formed by an oxidative polymerization reaction using a polymerization liquid,
    said polymerization liquid containing a monomer and a dopant containing alkylammonium ions as a cationic component,
    said alkylammonium ions being secondary ammonium ions.

2. The method of manufacturing a solid electrolytic capacitor according to claim 1, wherein said dopant contains sulfonic acid ions as an anionic component.

3. The method of manufacturing a solid electrolytic capacitor according to claim 1, wherein said alkylammonium ions are dimethylammonium ions.

4. The method of manufacturing a solid electrolytic capacitor according to claim 2, wherein said polymerization liquid contains 1.0 to 1.5 moles of said sulfonic acid ions relative to 1 mole of said alkylammonium ions.

5. The method of manufacturing a solid electrolytic capacitor according to claim 1, wherein said polymerization liquid further contains, as an oxidant, an ammonium salt formed from one or more types selected from ammonium sulfate, ammonium persulfate, ammonium oxalate, and ammonium perchlorate.

6. The method of manufacturing a solid electrolytic capacitor according to claim 1, wherein said oxidative polymerization reaction is performed under a reduced-pressure atmosphere.

* * * * *